No. 672,291. Patented Apr. 16, 1901.
R. SIMMONDS.
CANDLE HOLDER.
(Application filed Aug. 30, 1900.)

(No Model.)

Witnesses:—
O. F. Soynek.
M. A. Scherer

Inventor
Richard Simmonds
By Knight Bros.
Attys.

THE NORRIS PETERS CO., PHOTO-LITHO., WASHINGTON, D. C.

UNITED STATES PATENT OFFICE.

RICHARD SIMMONDS, OF COROMANDEL, NEW ZEALAND.

CANDLE-HOLDER.

SPECIFICATION forming part of Letters Patent No. 672,291, dated April 16, 1901.

Application filed August 30, 1900. Serial No. 28,622. (No model.)

*To all whom it may concern:*

Be it known that I, RICHARD SIMMONDS, a subject of the Queen of Great Britain, residing at Coromandel, New Zealand, have invented a new and useful Candle-Holder; and I do hereby declare the following to be a full, clear, and exact description of the same.

This invention relates to devices used for holding candles, its object being to provide a simple and inexpensive holder in which a candle may be securely held until it is entirely consumed, or nearly so.

Candles of different sizes may be held by the holder, which does not become clogged with grease or injured by the heat of the flame.

The holder comprises springs provided with vertical grippers and flaring ends for the ready insertion of the candle. The base of the holder is made to fit the socket of any ordinary candlestick or sconce and is preferably made of cork, though metal springs or the like may be used.

The invention is described in this specification as applicable to a base made of cork. I pass wires forming the shanks of the grippers through a plate of metal, and then through the cork, and finally through a plate at the base of the cork.

The accompanying drawings illustrate the invention.

Figure 1:
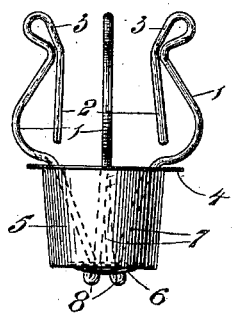
Figure 2:
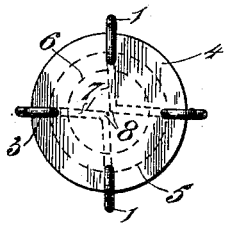

Figure 1 is a side view of the holder. Fig. 2 is a plan of the same.

Similar figures of reference indicate the same parts throughout the views, wherein—

1 represents the grippers, shaped as shown. 2 represents downward extensions of the same, provided with flaring ends 3.

4 is the top plate; 5, the base of the holder, preferably made of cork; 6, the bottom plate; 7, the shanks of the grippers, passing through the cork, and 8 the ends of the wires projecting through the plate 6 and bent or upset, as shown, to secure the shanks within the body.

The candle is held to the downward extensions 2 and when nearly consumed is prevented from damaging the cork by the plate 4.

What I claim as my invention, and desire to secure by Letters Patent, is—

The combination of the sconce-body 5; top plate 4 and bottom plate 6 applied thereto; and grippers 1 having bowed upper ends 3, flaring outward for the reception of the candle, downward extensions 2 with free ends to hold the lower extremity of the candle, and shanks 7 passing through the top plate 4, body 5 and bottom plate 6 and secured beneath the latter by suitable bends or heads 8; all as shown and described.

In testimony whereof I have signed this specification in the presence of two subscribing witnesses.

RICHARD SIMMONDS.

Witnesses:
J. H. PORTER,
C. BROOKE-SMITH.